(12) United States Patent
Suzuki (10) Patent No.: US 6,543,815 B2
(45) Date of Patent: Apr. 8, 2003

(54) TUBE JOINT AND METHOD OF CONSTRUCTING THE SAME

(75) Inventor: Isao Suzuki, Tokyo (JP)

(73) Assignee: Flowell Corporation, Tokyo (JP)

( * ) Notice: Subject to any disclaimer, the term of this patent is extended or adjusted under 35 U.S.C. 154(b) by 0 days.

(21) Appl. No.: 09/943,001

(22) Filed: Aug. 31, 2001

(65) Prior Publication Data

US 2002/0033602 A1 Mar. 21, 2002

(30) Foreign Application Priority Data

Aug. 31, 2000 (JP) .......................... 2000-262106

(51) Int. Cl.[7] ................................................ F16L 25/00
(52) U.S. Cl. ...................... 285/331; 289/384; 289/354
(58) Field of Search .................................. 285/331, 382, 285/382.1, 384, 354

(56) References Cited

U.S. PATENT DOCUMENTS

| | | | | |
|---|---|---|---|---|
| 5,154,453 A | * | 10/1992 | Nishio | 285/341 |
| 5,388,871 A | * | 2/1995 | Saitoh | 285/247 |
| 6,022,053 A | * | 2/2000 | Hukuda | 285/331 |
| 6,193,239 B1 | * | 2/2001 | Fukano et al. | 277/615 |
| 6,354,634 B1 | * | 3/2002 | Dischler | 285/231 |

FOREIGN PATENT DOCUMENTS

| | | | |
|---|---|---|---|
| JP | 03-168495 | * | 7/1991 |
| JP | 04-4389 | * | 1/1992 |
| JP | 6-174156 | * | 6/1994 |

* cited by examiner

Primary Examiner—Lynne H. Browne
Assistant Examiner—Aaron Dunwoody
(74) Attorney, Agent, or Firm—Kanesaka & Takeuchi (57) ABSTRACT

The present invention relates to a method of constructing a tube joint wherewith one end T1 of a tubing T is heated to be softened; the softened end T1 of the tubing T is inserted into a drop-off prevention ring 30; the end T1 of the tubing T is upset by means of an upsetting core 50 such that the anchoring portion 35 of the drop-off prevention ring 30 bites into the softened end T1 of the tubing T; and the end T1 of the tubing T is cooled to be hardened with the anchoring portion 35 of the drop-off prevention ring 30 being kept biting into it, and to such tube joint.

8 Claims, 8 Drawing Sheets

TUBE JOINT AND METHOD OF CONSTRUCTING THE SAME

BACKGROUND OF THE INVENTION

1. Field of the Invention

The present invention relates to a tube joint and a method of constructing it wherewith one end of a tubing is passed through a through-hole in a cap nut that is provided in the direction of the axis of the threaded portion of the cap nut, a drop-off prevention ring being anchored to the end of the tubing, being fitted thereto, a joint main body being fitted into the end of said tubing, the external thread of the joint main body being engaged with the internal thread of said cap nut for allowing the hole edge portion of the through-hole in said cap nut to be pressed against one end of said drop-off prevention ring, in order to provide drop-off prevention of the tubing.

2. Description of the Prior Art

Such tube joints are already known from, for example, Japanese Unexamined Patent Publication No. 8(1996)-247353, now patented as Patent No. 2756929 and Japanese Unexamined Patent Publication No. 10 (1998)-318475.

The former is a tube joint which is constructed by passing the end of a tube through the through-hole in a cap nut, upsetting the end of the tube by means of an upsetting jig, fitting a drop-off prevention ring to the end of the tube, and welding the drop-off prevention ring to the upset end of the tube by means of a heat source h disposed around the drop-off prevention ring.

Into the end of the tube to which the drop-off prevention ring is welded inserted the insertion cylinder portion of the joint main body. At this time, the drop-off prevention ring and the end of the tube are inserted into the annular groove in the joint main body. Then, by screw attaching the cap nut, with which the tube is passed through the through-hole therein, to the joint main body, a tube joint is constructed. If a force is applied to the tube in the direction of causing it to drop off, one end of the drop-off prevention ring is pressed against the hole edge portion of the cap nut, which prevents the tube from dropping off.

The latter is a tube joint which is constructed by upsetting the end of a tube, pressure fitting a shape ring into the upset end, the shape ring being formed to an angle section for providing a sloping portion for the tube, and pressing the annular anchoring protrusion of the cap nut against the sloping portion of the tube for prevention of the tube from dropping off.

However, with such conventional tube joints, there have been problems: with the former, because the end of the tube is upset, and the drop-off prevention ring is welded to the end of the tube, a device which has both an upsetting jig and a welding means including a heat source h, and thus is large-sized and complicated, is required, resulting in the cost being increased.

With the latter, a shape ring is pressure fitted into the upset end of the tube, resulting in the diameter of the end of the tube being further increased, and thus the tube is used, being subjected to a high load. Therefore, the durability is rather unsatisfactory, and the size of the cap nut to be pressed against the upset end of the tube is increased, which can be a difficulty in making the entire tube joint compact.

SUMMARY OF THE INVENTION

The present invention has been developed in consideration of these problems, and it is intended to provide a tube joint and a method of constructing it with which the drop-off prevention ring can be attached to the end of the tubing with a simple device, the cost can be reduced, the durability can be bettered, and the size of the entire tube joint can be minimized.

This purpose of the present invention can be achieved by:

[1] A tube joint wherewith one end (T1) of a tubing (T) is passed through a through-hole (22) in a cap nut (20) that is provided in the direction of the axis of the threaded portion of the cap nut (20), a drop-off prevention ring (30) being anchored to the end (T1) of the tubing (T), being fitted thereto, a joint main body (10) being fitted into the end (T1) of said tubing (T), the external thread (15) of the joint main body (10) being engaged with the internal thread (25) of said cap nut (20) for allowing the hole edge portion of the through-hole (22) in said cap nut (20) to be pressed against one end of said drop-off prevention ring (30), in order to provide drop-off prevention of the tubing (T), wherein
said drop-off prevention ring (30) has an anchoring portion (35) which projects from the bore surface thereof toward the inside; and
said anchoring portion (35) bites into the end (T1) of said tubing (T), being anchored thereto.

[2] A method of constructing a tube joint wherewith one end (T1) of a tubing (T) is passed through a through-hole (22) in a cap nut (20) that is provided in the direction of the axis of the threaded portion of the cap nut (20), a drop-off prevention ring (30) being anchored to the end (T1) of the tubing (T), being fitted thereto, a joint main body (10) being fitted into the end (T1) of said tubing (T), the external thread (15) of the joint main body (10) being engaged with the internal thread (25) of said cap nut (20) for allowing the hole edge portion of the through-hole (22) in said cap nut (20) to be pressed against one end of said drop-off prevention ring (30), in order to provide drop-off prevention of the tubing (T), comprising the steps of:
fitting the end (T1) of said tubing (T) that is softened by heating, into said drop-off prevention ring (30);
causing said anchoring portion (35) which projects from the bore surface thereof toward the inside, to bite into the softened end (T1) of said tubing (T); and
cooling the end (T1) of said tubing (T) for hardening it with said anchoring portion (35) biting into the end (T1) of said tubing (T).

[3] The tube joint according to [1] or the method of constructing a tube joint according to [2], wherein said anchoring portion (35) is projected along a plane perpendicular to the central axis of said drop-off prevention ring (30) or it is projected slantwise with respect to the perpendicular plane and toward the end of the drop-off prevention ring (30) that is opposite to the end of said drop-off prevention ring (30) which can be pressed against the hole edge portion of the through-hole (22) in said cap nut (20).

[4] The tube joint or the method of constructing a tube joint according to [3], wherein the anchoring portion (35) is formed annularly along the circumference of the bore surface of the drop-off prevention ring (30), and a plurality of anchoring portions are provided in the direction perpendicular to said circumference.

[5] The tube joint according to [1] or the method of constructing a tube joint according to [2], wherein the one end of said drop-off prevention ring (30) has a thin-wall section (33) which can be elastically deformed when pressed against the hole edge portion of the through-hole (22) in said cap nut (20).

[6] The method of constructing a tube joint according to any one of [2] to [5], wherein the end (T1) of said tubing (T) that is softened by heating is fitted into said drop-off prevention ring (30), and by upsetting the softened end (T1) of said tubing (T), the anchoring portion (35) of said drop-off prevention ring (30) is caused to bite into the end (T1) of the tubing (T).

[7] The tube joint according to any one of [1] and [3] to [5], wherein the end (T1) of said tubing (T) is upset, and said anchoring portion (35) bites into the upset end (T1) of said tubing (T), being anchored thereto.

The functions of the inventions as stated in the above paragraphs [1] to [7] will be described here.

By softening the end (T1) of a tubing (T) by some means, the anchoring portion (35) of a drop-off prevention ring (30) is allowed to easily bite into the softened end (T1) of the tubing (T).

When the end (T1) of the tubing (T) into which the anchoring portion (35) bites is cooled, it is hardened with the anchoring portion (35) of the drop-off prevention ring (30) biting into it, thus, the drop-off prevention ring (30) can be attached to the end (T1) of the tubing (T) with ease.

By using, for example, an upsetting jig, a drop-off prevention ring (30) can be simply attached to one end (T1) of a tubing (T).

In particular, the drop-off prevention ring (30) is fitted into the holding hole (47) of the support cylinder (40) in the upsetting jig. Into the holding hole (47) of the support cylinder (40) is inserted the end (T1) of the tubing (T) that is softened by, for example, heating. Then, an annular clearance is formed between the end (T1) of the tubing (T) and the drop-off prevention ring (30). The anchoring portion (35) of the drop-off prevention ring (30) is projected toward the end (T1) of the tubing (T).

Then, fitting the upsetting core (50) in the upsetting jig into the end (T1) of the tubing (T) will easily upset the end (T1) of the tubing (T) because it is softened, and at the same time, cause the anchoring portion (35) of the drop-off prevention ring (30) to bite into the softened and upset end (T1) of the tubing (T) with ease.

Then, cooling the end (T1) of the tubing (T) naturally or positively will harden it with the anchoring portion (35) of the drop-off prevention ring (30) being kept biting into the end (T1) of the tubing (T). Thus, the drop-off prevention ring (30) can be simply attached to the end (T1) of the tubing (T).

With a tube joint which comprises a drop-off prevention ring (30) attached to one end (T1) of a tubing (T), if a force is applied to the tubing (T) in the direction of causing it to drop off, one end (31) of the drop-off prevention ring (30) is pressed against the hole edge portion of the through-hole (22) in the cap nut (20), which prevents the tubing (T) from dropping off. The reaction force caused when the one end (31) of the drop-off prevention ring (30) is pressed against the hole edge portion of the through-hole (22) in the cap nut (20) provides a force in the direction from the one end (31) of the drop-off prevention ring (30) toward the other end (32), i.e., a force in the direction of removing the drop-off prevention ring (30) from the end (T1) of the tubing (T).

However, because the anchoring portion (35) of the drop-off prevention ring (30) is projected along a plane perpendicular to the central axis of the drop-off prevention ring (30) or it is projected slantwise with respect to the perpendicular plane and toward the other end (32) of the drop-off prevention ring (30) that is opposite to the one end (31) of the drop-off prevention ring (30) which can be pressed against the hole edge portion of the through-hole (22) in the cap nut (20), the anchoring portion (35) of the drop-off prevention ring (30) is caused to further bite into the end (T1) of the tubing (T), the drop-off prevention ring (30) will not be removed from the end (T1) of the tubing (T), thus being kept attached to the end (T1) of the tubing (T).

The anchoring portion (35) may be provided in various geometries and numbers. For example, when it is formed annularly along the circumference of the bore surface of the drop-off prevention ring (30), and a plurality of anchoring portions are provided along the central axis of the drop-off prevention ring (30), the anchoring portions (35) can sufficiently resist a high force which might be applied to the tubing (T) in the direction of causing it to drop off. A number of annular anchoring portions (35) may be provided over the entire bore surface of the drop-off prevention ring (30).

By periodically retightening the cap nut (20), the tube joint is maintained in the proper condition. As the cap nut (20) is retightened, the distance between the hole edge portion of the through-hole (22) in the cap nut (20) and the one end (31) of the drop-off prevention ring (30) is decreased, and finally the hole edge portion of the through-hole (22) reaches the one end (31) of the drop-off prevention ring (30) to press it. However, at the one end (31) of the drop-off prevention ring (30), a thin-wall section (33) is formed, and this thin-wall section (33) can be elastically deformed when pressed against the hole edge portion of the through-hole (22) in the cap nut (20), which allows easy retightening of the cap nut (20). In addition, the thin-wall section (33) will accommodate the reaction force to the drop-off prevention ring (30) that is caused when the thin-wall section (33) is pressed against the hole edge portion of the through-hole (22), which eliminates the possibility of the drop-off prevention ring (30) being removed from the end (T1) of the tubing (T). Further, the adverse effect on the sealing point (the point where the tubing (T) is sandwiched between the hole edge (221) of the through-hole (22) in the cap nut (20) and the end (121) of the connecting cylinder (12) of the joint main body (10)) can be minimized.

DESCRIPTION OF THE PREFERRED EMBODIMENTS

Hereinbelow, one embodiment of the present invention will be described with reference to the drawings.

Each drawing shows one embodiment of the invention.

Figure 2:
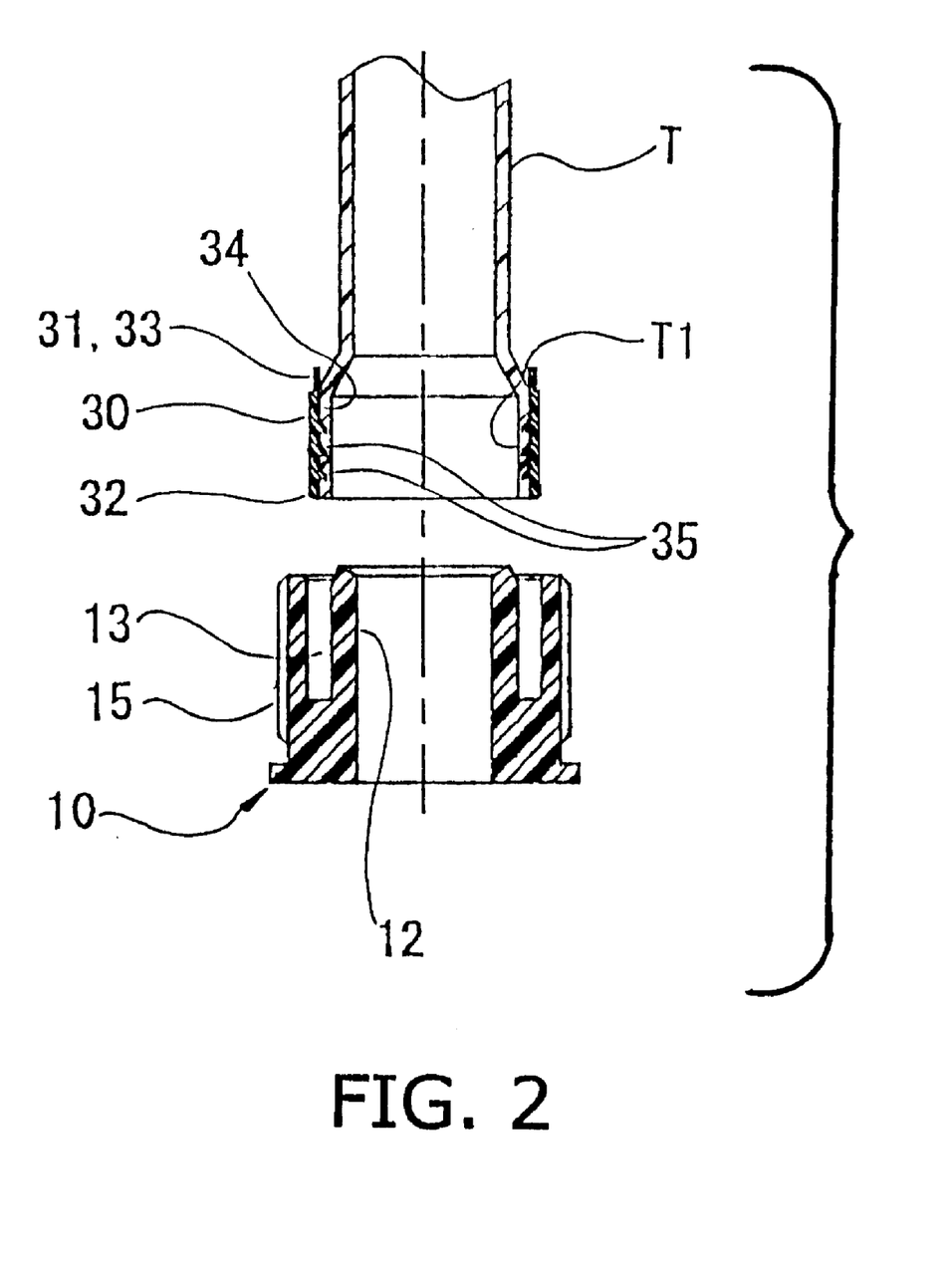
FIG. 2 is a sectional view showing the end of a tubing according to one embodiment of the present invention that is before being fitted into a joint main body.

FIG. 2 is a sectional view showing the end T1 of a tubing T according to one embodiment of the present invention that is before being fitted into a joint main body 10.

As shown in FIG. 2, in the present embodiment, the end T1 of the tubing T is upset with a drop-off prevention ring 30 being anchored to the outer diameter thereof.

At one end 31 of the drop-off prevention ring 30, a thin-wall section 33 is formed. On the bore surface 34 of the drop-off prevention ring 30, an anchoring portion 35 is formed. The anchoring portion 35 is formed annularly along the circumference of the bore surface 34 of the drop-off prevention ring 30; a plurality of anchoring portions (three in this embodiment) being provided in the direction of the height of the drop-off prevention ring 30. The anchoring portion 35 is projected toward the inside of the drop-off prevention ring 30.

In particular, assuming that the anchoring portion 35 is cut along the central axis of the drop-off prevention ring 30, the section of the anchoring portion 35 has a roughly triangular geometry. The bottom 351 of the anchoring portion 35 provides a plane perpendicular to the central axis of the drop-off prevention ring 30, and the top 352 of provides a plane inclined to said perpendicular plane and toward the other end 32 of the drop-off prevention ring 30.

Figure 3:
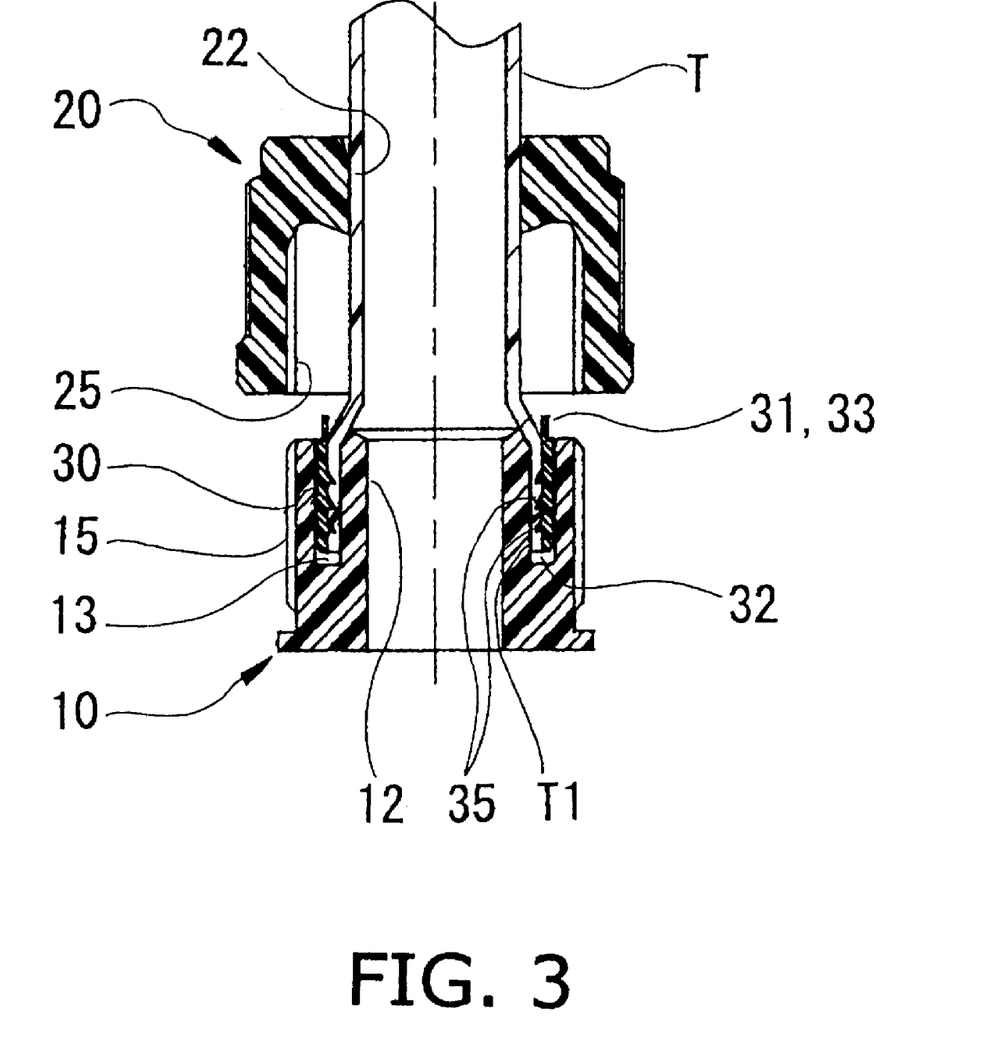
FIG. 3 is a sectional view showing the state in which the end of the tubing according to one embodiment of the present invention is inserted into the joint main body, but a cap nut is not yet engaged with the joint main body.

FIG. 3 is a sectional view showing the state in which the upset end T1 of the tubing T is inserted into the joint main body 10, but a cap nut 20 is not yet engaged with the joint main body 10.

In other words, a connecting cylinder 12 of the joint main body 10 is inserted into the upset end T1 of the tubing T. Around the connecting cylinder 12 of the joint main body 10, an annular groove 13, with which the connecting cylinder 12 provides a groove wall, is formed. The end T1 of the tubing T and the drop-off prevention ring 30 are fitted into the annular groove 13. In the joint main body 10, an external thread 15 is formed.

An internal thread 25 to be engaged with the external thread 15 of the joint main body 10 is formed in the cap nut 20. The cap nut 20 has a through-hole 22 provided in the direction of the axis of the threaded portion thereof, the end T1 of the tubing T being passed through the through-hole 22.

Figure 1:
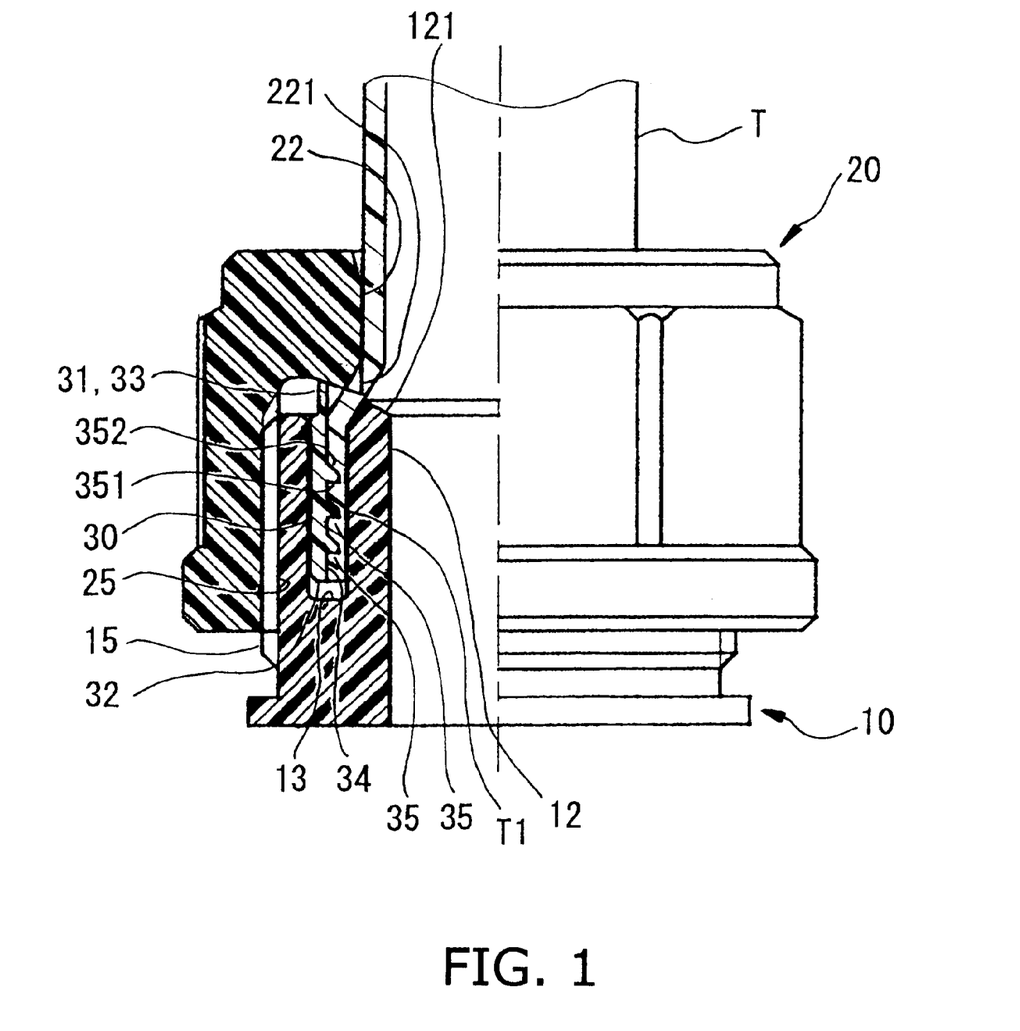
FIG. 1 is a nearly half-sectional view of the tube joint according to one embodiment of the present invention.
Figure 4:
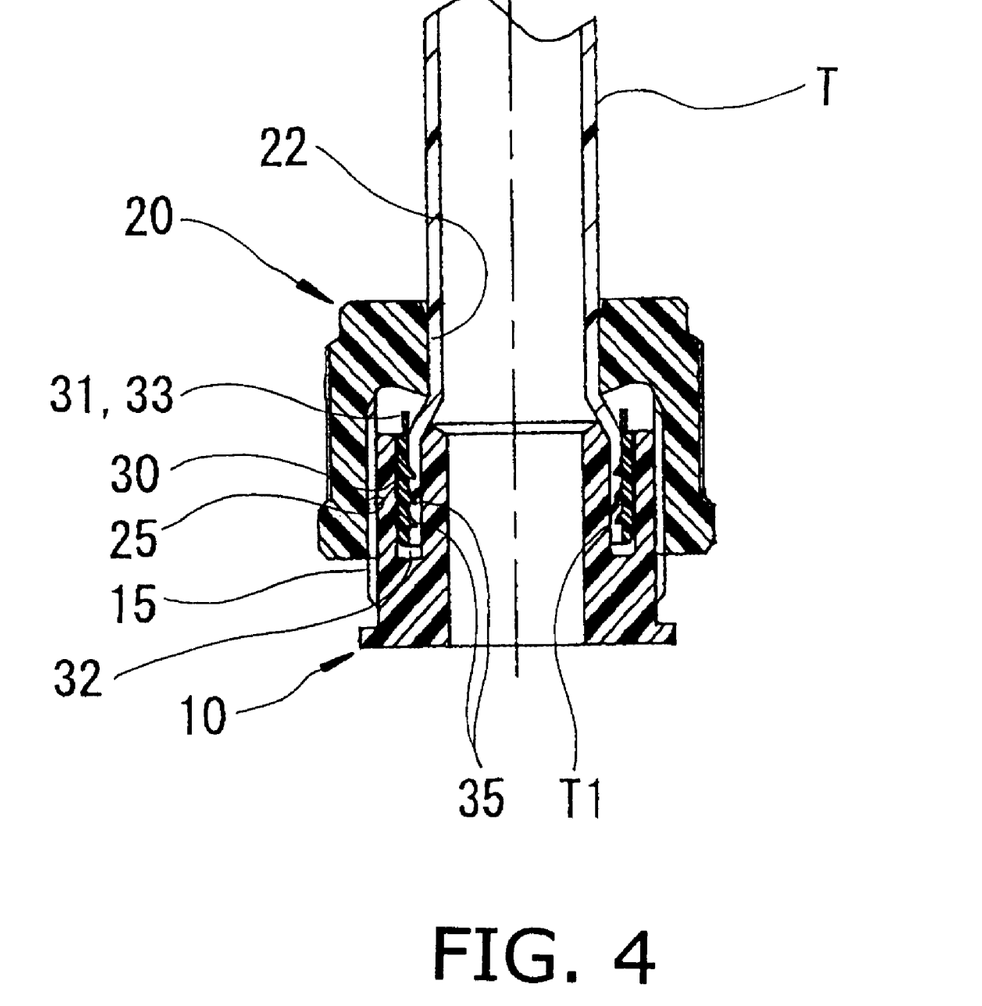
FIG. 4 is a sectional view of the tube joint according to one embodiment of the present invention.

FIG. 1 is a nearly half-sectional view of the tube joint and FIG. 4 is a full-sectional view of the tube joint.

As shown in FIG. 1 and FIG. 4, by engaging the external thread 15 of the joint main body 10 with the internal tread 25 of the cap nut 20, a tube joint is formed. With such a tube joint, as can be seen from comparison of the state of the cap nut 20 before being retightened as shown in FIG. 1 with that of the cap nut 20 after being retightened a few times as shown in FIG. 4, a hole edge 221 of acute angle sectional geometry of the through-hole 22 in the cap nut 20 keeps the tubing T being pressed against the end 121 of acute angle sectional geometry of the connecting cylinder 12 of the joint main body 10, which maintains the tube joint in a proper condition (a hermetically sealed condition).

The tubing T and the drop-off prevention ring 30 are made of a fluorocarbon plastic, such as tetrafluoroethylene/ perfluoro alkyl vinyl ether copolymer (PFA). On the other hand, when the tubing T is an integral part of a machine component, it may be made of a fluorocarbon plastic, such as polytetrafluoroethylene (PTFE), which is easier to cut than PFA.

A device for constructing such tube joint upsets the end T1 of the tubing T and anchors the drop-off prevention ring 30 to the end T1 of the tubing T, being equipped with a support cylinder 40 and an upsetting core 50. The cylindrical hole in the support cylinder 40 consists of a through-hole 45 of a smaller diameter into which the tubing T is inserted, an intermediate hole 46 of a larger diameter connected to the through-hole 45, and a holding hole 47 of a still larger diameter.

Figure 7:
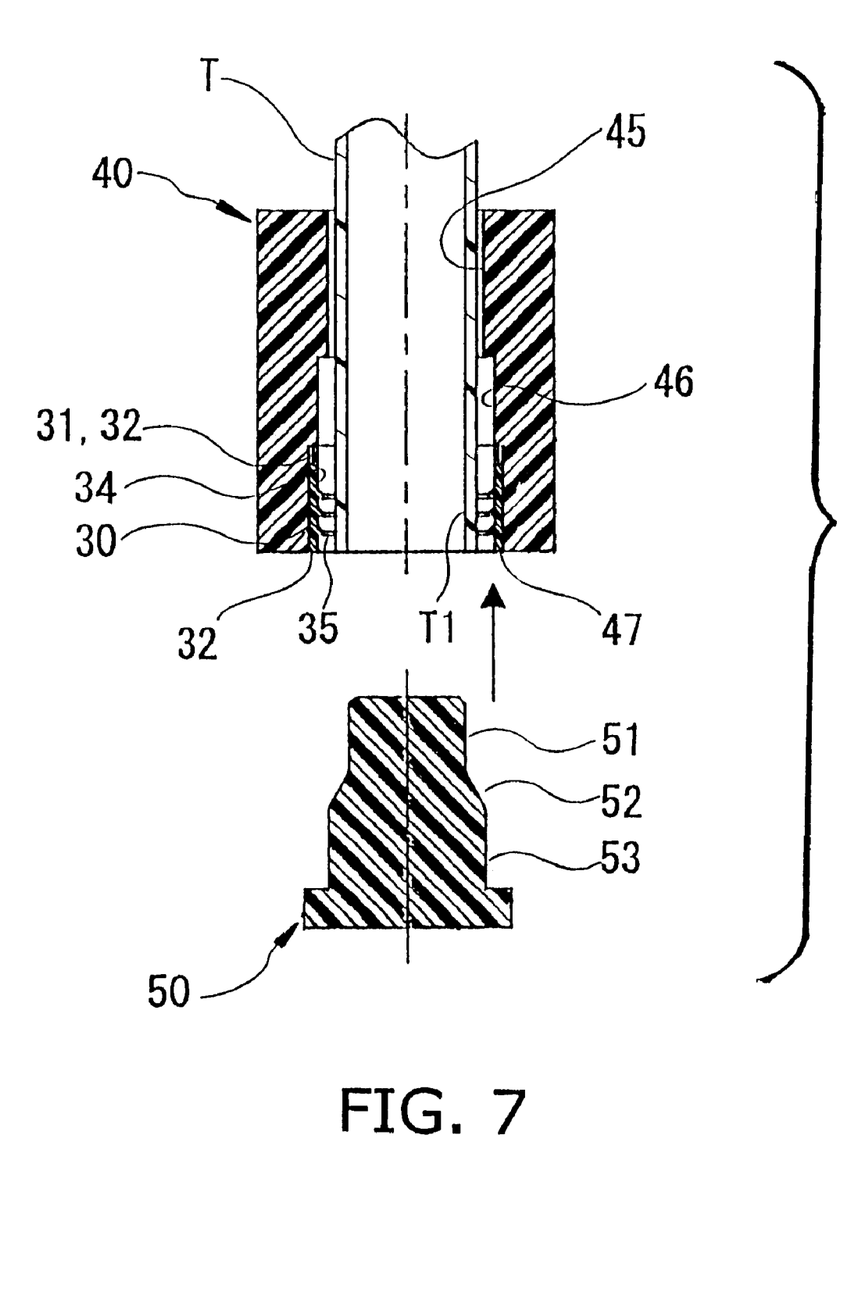
FIG. 7 represents the way of constructing the tube joint according to one embodiment of the present invention, being a sectional view showing the state before the end of the tubing loaded in the support cylinder is upset by means of the upsetting core.
Figure 8:
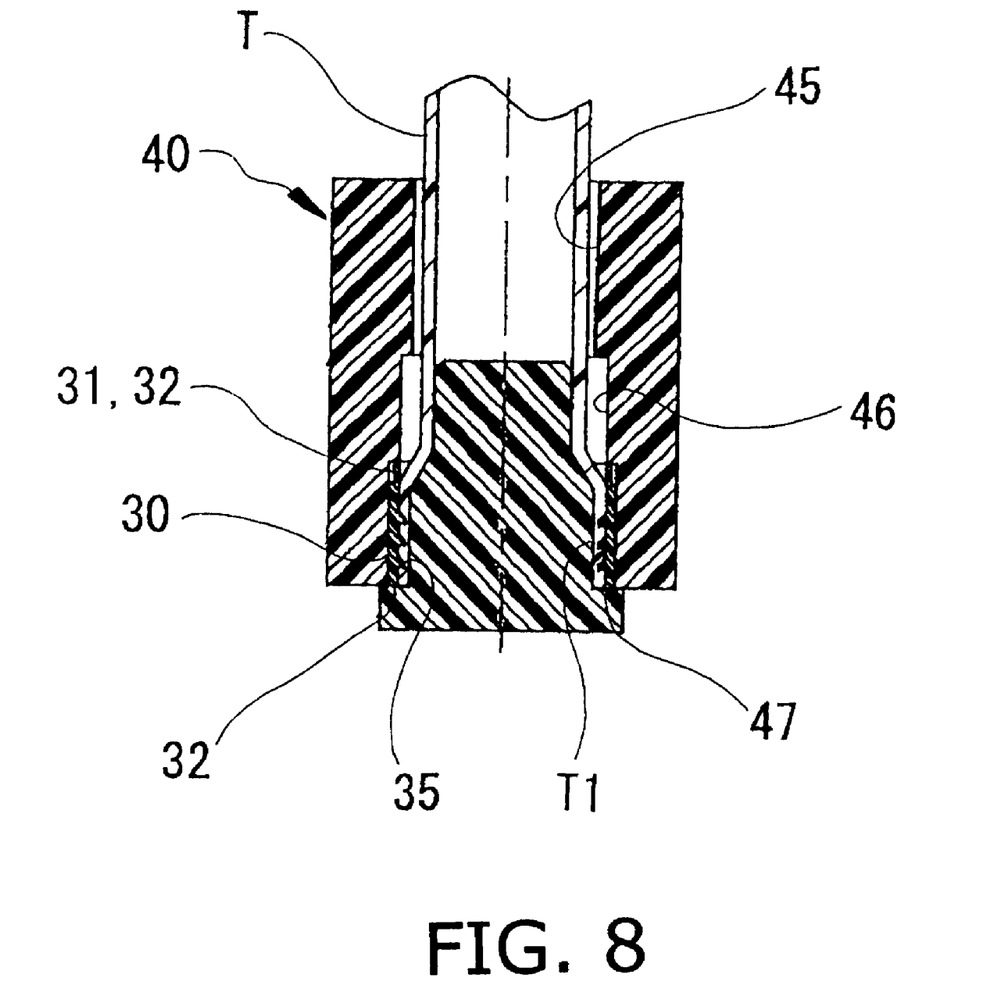
FIG. 8 is a sectional view showing the state in which the end of the tubing according to one embodiment of the present invention that is loaded in the support cylinder in the upsetting jig has been upset by the upsetting core.

The upsetting core 50, which upsets the end T1 of the tubing T heated to be softened, is made of a material with minimum amounts of metallic irons and impurities (such as silica glass, PTFE, and PEEK), having a smaller diameter portion 51, a stepped portion 52, and a larger diameter portion 53 from top to bottom.

The smaller diameter portion 51 has approximately the same diameter as the inner diameter of the end T1 of the tubing T before being upset, the larger diameter portion 53 has approximately the same diameter as the inner diameter of the end T1 of the tubing T to be upset, while, with the stepped diameter portion 52, the diameter is gradually increased from the smaller diameter portion 51 to the larger diameter portion 53.

Figure 5:
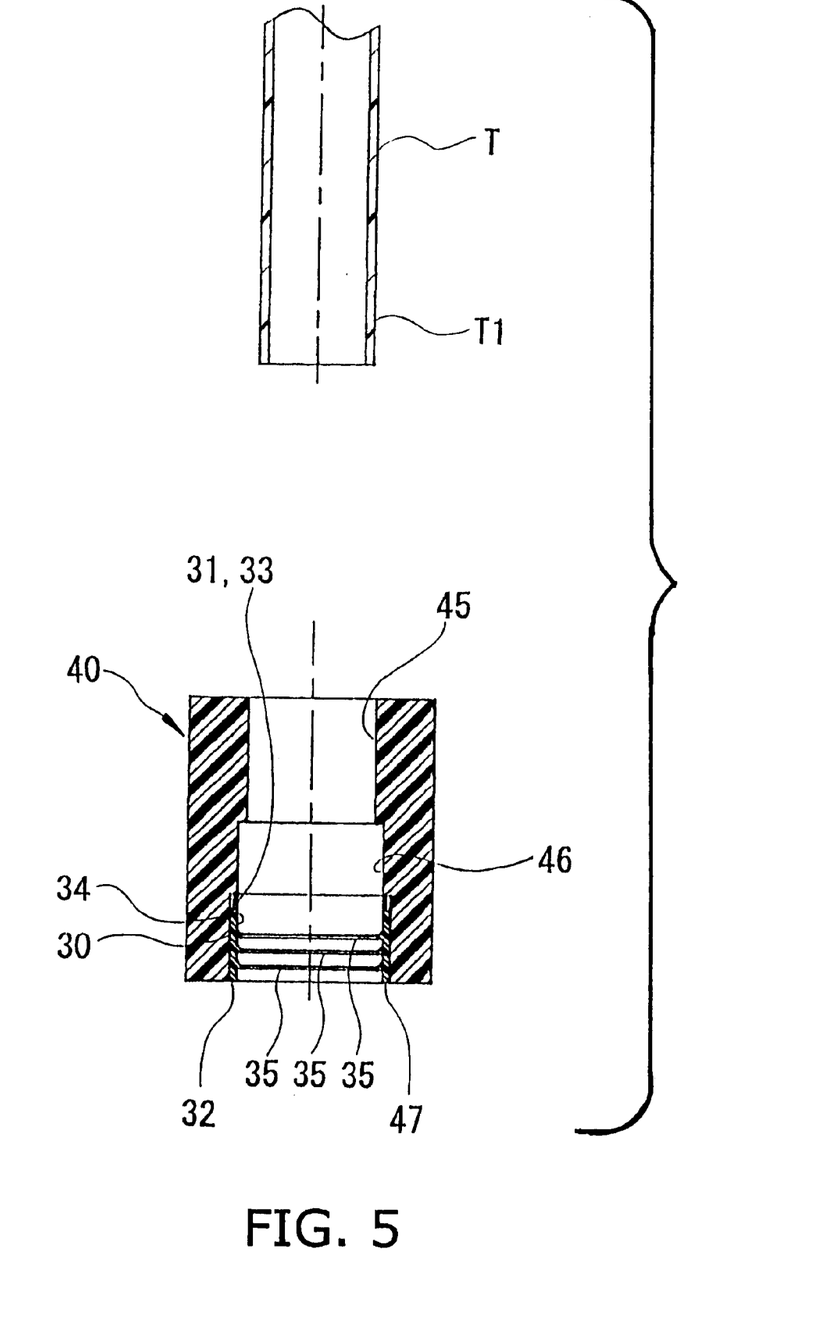
FIG. 5 represents the way of constructing the tube joint according to one embodiment of the present invention, being a sectional view showing the state in which the drop-off prevention ring is loaded in the support cylinder.

The inner diameter of the holding hole 47 is approximately equal to the outer diameter of the drop-off prevention ring 30, and the difference in diameter between the intermediate hole 46 and the holding hole 47 is approximately equal to the thickness of the drop-off prevention ring 30. In addition, the height of the holding hole 47 is approximately equal to the height of the drop-off prevention ring 30. Thus, the drop-off prevention ring 30 is supported, being fitted into the holding hole 47 of the support cylinder 40 without clearance.

Next, the way of constructing the tube joint will be described.

FIG. 5 is a sectional view showing the state in which the drop-off prevention ring 30 is loaded in the support cylinder 40. As shown in FIG. 5, the drop-off prevention ring 30 is loaded, being fitted into the holding hole 47 of the support cylinder 40. At this time, the end T1 of the tubing T is not inserted into the cylindrical hole in the support cylinder 40 and is not upset.

The end T1 of the tubing T is softened by, for example, heating. Heating of the tubing T can be performed by various methods. For example, the end T1 of the tubing T is heated to be softened by placing it within the heating ring which generates heat, being subjected to an alternative magnetic field.

Figure 6:
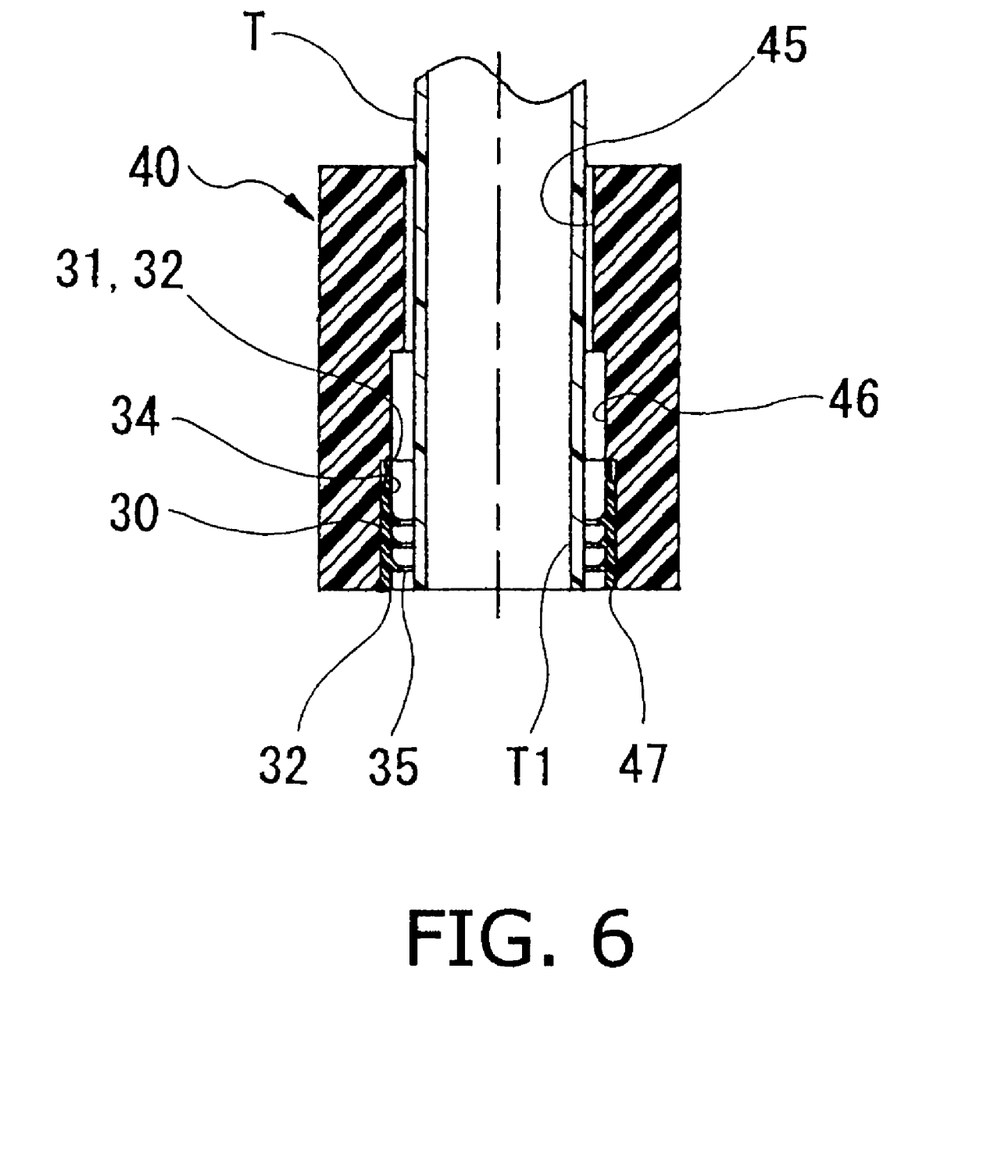
FIG. 6 represents the way of constructing the tube joint according to one embodiment of the present invention, being a sectional view showing the state in which the end of the tubing has been inserted into the support cylinder.

FIG. 6 is a sectional view showing the state in which the end T1 of the tubing T has been passed through the through-hole 45 in the support cylinder 40. As shown in FIG. 6, before the drop-off prevention ring 30 is anchored to the end T1 of the tubing T, a clearance is formed between the inserted end T1 of the tubing T and the bore surface 34. The anchoring portion 35 formed annularly along the circumference of the bore surface 34 of the drop-off prevention ring 30 is projected toward said clearance, forming a guide hole having a slightly smaller diameter than that of the through-hole 45. Thus, the drop-off prevention ring 30 provides a positioning means for guiding the end T1 of the tubing T for positioning it.

FIG. 7 is a sectional view showing the state before the end T1 of the tubing T loaded in the support cylinder 40 is upset by means of the upsetting core 50. FIG. 8 is a sectional view showing the state in which the end T1 of the tubing T loaded in the support cylinder 40 has been upset by the upsetting core 50.

As shown in FIG. 7 and FIG. 8, the upsetting core 50 is inserted into the softened end T1 of the tubing T from the smaller diameter section 51 to the larger diameter section 53 such that the inner diameter of the end T1 of the tubing T is upset to approximately the same diameter as that of the external diameter of the connecting cylinder 12 of the joint main body 10 to be fitted. At this time, the anchoring portion 35 of the drop-off prevention ring 30 easily bites into the softened end T1 of the tubing T. At this time, because the bottom 351 of the anchoring portion 35 provides a plane perpendicular to the central axis of the drop-off prevention ring 30, and the top 352 of the anchoring portion 35 provides a plane inclined to said perpendicular plane and toward the other end 32 of the drop-off prevention ring 30, i.e., the anchoring portion 35 is wedge-shaped, it can easily bite into the end T1 of the tubing T without being subjected to a high resistance.

Next, cooling the end T1 of the tubing T naturally or positively will harden it with the anchoring portion 35 of the drop-off prevention ring 30 being kept biting into the end T1 of the tubing T. Thus, the drop-off prevention ring 30 can be simply attached to the end T1 of the tubing T.

The drop-off prevention ring 30 is thus attached to the end T1 of the tubing T. With this tube joint, liquid intermittently fed to the tubing T applies a force to the tubing T in the direction of causing it to drop off.

On the other hand, by retightening the cap nut 20, the hole edge of acute angle sectional geometry of the through-hole 22 in the cap nut 20 can keep the tubing T being pressed against the end of acute angle sectional geometry of the connecting cylinder 12 of the joint main body 10, therefore, if a force is applied to the tubing T in the direction of causing it to drop off, that force can be cancelled.

In addition, the thin-wall section 33 formed at one end 31 of the drop-off prevention ring 30 is pressed against the hole edge portion of the through-hole 22 in the cap nut 20, preventing the tubing T from dropping off. In particular, as the force applied to the tubing T in the direction of causing it to drop off is increased, the thin-wall section 33 is more heavily deformed to cancel that force.

The reaction force caused when the thin-wall section 33 of the drop-off prevention ring 30 is pressed against the hole edge portion of the through-hole 22 in the cap nut 20 provides a force in the direction from one end 31 of the drop-off prevention ring 30 toward the other end 32, i.e., a force in the direction of removing the drop-off prevention ring 30 from the end T1 of the tubing T.

However, because the bottom 351 of the anchoring portion 35 of the drop-off prevention ring 30 is projected along a plane perpendicular to the central axis of the drop-off prevention ring 30, the anchoring portion 35 of the drop-off prevention ring 30 will resist the force in the direction of removing the drop-off prevention ring 30 from the end T1 of the tubing T, thereby the drop-off prevention ring 30 will not be removed from the end T1 of the tubing T, thus being kept attached to the end T1 of the tubing T.

As can be seen from the above description, periodically retightening the cap nut 20 will maintain the tube joint in the proper condition. As the cap nut 20 is retightened, the distance between the hole edge portion of the through-hole 22 in the cap nut 20 and the one end 31 of the drop-off prevention ring 30 is decreased, and finally the hole edge portion of the through-hole 22 reaches the one end 31 of the drop-off prevention ring 30 to press it.

However, at the one end 31 of the drop-off prevention ring 30, a thin-wall section 33 is formed, and this thin-wall section 33 can be elastically deformed when pressed against the hole edge portion of the through-hole 22 in the cap nut 20, which allows easy retightening of the cap nut 20. In addition, the deformation of the thin-wall section 33 will accommodate the reaction force caused when the thin-wall section 33 of the drop-off prevention ring is pressed against the hole edge portion of the through-hole 22, which results in the drop-off prevention ring being not subjected to any high reaction force.

In the above-mentioned embodiment, an upsetting jig is used to upset the softened end T1 of the tubing T for causing the anchoring portion 35 of the drop-off prevention ring 30 to bite into the end T1 which is softened, however, the method of attaching the drop-off prevention ring 30 to the end T1 is not limited to this. With an alternative method, the drop-off prevention ring 30 is expanded, and is kept expanded against the resilience, then, the drop-off prevention ring 30 is fitted to the softened end T1. Then, when the drop-off prevention ring 30 shrinks, it positively attaches to the softened end T1. In the above-mentioned embodiment, the end T1 of the tubing T is heated to be softened, however, the means of softening the end T1 of the tubing T is not limited to this.

In the above-mentioned embodiment, the anchoring portion 35 of the drop-off prevention ring 30 is projected along a plane perpendicular to the central axis of the drop-off prevention ring 30 or toward the other end 32, being inclined with respect to that plane, however, the anchoring portion 35 may have any shape so long as it can bite into the end T1 which is softened and upset.

Further, in the above-mentioned embodiment, the anchoring portion 35 of the drop-off prevention ring 30 is formed annularly along the circumference of the bore surface 34, however, the form of the anchoring portion is not limited to this. For example, the anchoring portion 35 may be formed consecutively along the circumference of the bore surface 34 at fixed intervals.

With the tube joint according to the present invention, the anchoring portion of the drop-off prevention ring is designed to bite into the end of the tubing for anchoring, which, for example, eliminates the need for welding the drop-off prevention ring to the end of the tubing, and allows the drop-off prevention ring to be easily attached to the end of the tubing by means of a simple device, resulting in the cost being lowered.

In addition, the end of the tubing is heated to be softened so that the anchoring portion of the drop-off prevention ring can easily bite into the end of the tubing, therefore, when the end of the tubing is cooled, it is hardened with the anchoring portion of the drop-off prevention ring biting into it, thus, the drop-off prevention ring can be attached to the end of the tubing with ease.

What is claimed is:

1. A tube joint comprising:
   a cap nut having a threaded portion with an internal thread, and a through-hole provided in a direction of an axis of said threaded portion, said through-hole having a hole edge portion;
   a tubing having an end passing through said through-hole of said cap nut;

a drop-off prevention ring having first and second ends, a bore surface, and at least one anchoring portion projecting from said bore surface and biting into said end of said tubing so that said drop-off prevention ring is attached to said end of said tubing; and a joint main body having an annular groove into which said end of said tubing and said drop-off preventive ring are fitted, and an external thread which is engaged with said internal thread of said cap nut so that said hole edge portion of said through-hole is pressed against said first end of said drop-off prevention ring in order to prevent drop-off of said tubing.

2. The tube joint according to claim 1, wherein said anchoring portion is projected in a plane perpendicular to a central axis of said drop-off prevention ring or slantwise with respect to said perpendicular plane and toward the second end of said drop-off prevention ring.

3. The tube joint according to claim 2, wherein said anchoring portions are provided annularly along a circumference of said bore surface of said drop-off prevention ring and in a direction perpendicular to said circumference.

4. The tube joint according to claim 1, wherein said first end of said drop-off prevention ring has a thin-wall section which can be elastically deformed when pressed against said hole edge portion of said through-hole.

5. The tube joint according to any one of claims 1–4, wherein said end of said tubing is upset so that said anchoring portion bites into said upset end of said tubing so as to be anchored thereto.

6. A method of constructing the tube joint according to any one of claims 1–4, comprising the steps of:

softening said end of said tubing by heating;

fitting said softened end of said tubing into said drop-off prevention ring;

making said anchoring portion of said drop-off preventive ring bite into said softened end of said tubing; and cooling said softened end of said tubing so that said softened end is hardened with said anchoring portion biting into said softended end.

7. The method of constructing the tube joint according to claim 6, wherein said step of making said anchoring portion of said drop-off preventive ring bite into said softened end of said tubing is made by upsetting said softened end.

8. The method of constructing the tube joint according to claim 7, wherein said upsetting of said softened end is made by using a upsetting core.

* * * * *